May 31, 1938.                F. P. D'ESOPO                2,119,319
                      ADJUSTABLE TAKE-OFF FITTING
                          Filed July 17, 1937
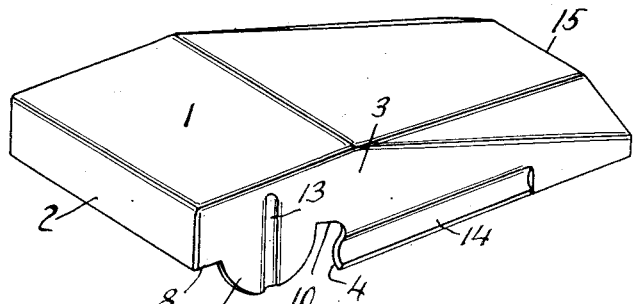
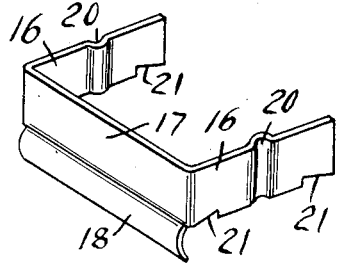
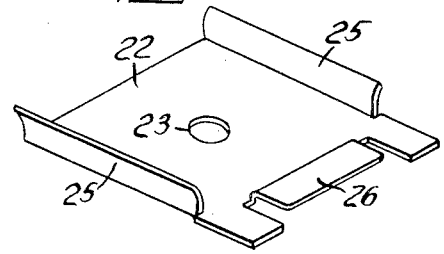
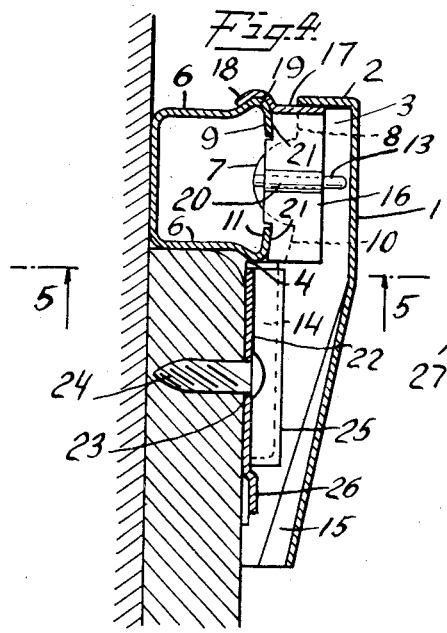
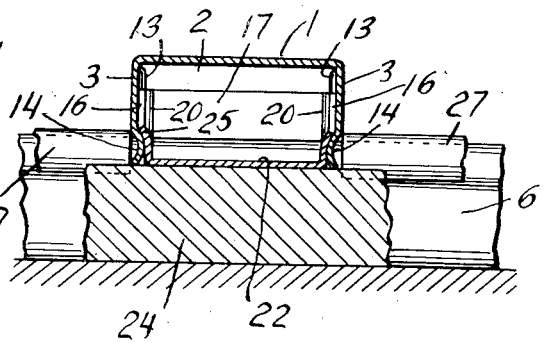
INVENTOR
FRANCIS P. D'ESOPO
BY
ATTORNEY Patented May 31, 1938

2,119,319

UNITED STATES PATENT OFFICE 2,119,319

ADJUSTABLE TAKE-OFF FITTING

Francis P. D'Esopo, Hartford, Conn., assignor to The Wiremold Company, Hartford, Conn., a corporation of Connecticut Application July 17, 1937, Serial No. 154,293

4 Claims. (Cl. 247—28)

This invention relates to electric conduit fittings and more particularly to take-off fittings for electric conduits. In its more specific aspect the invention relates to an adjustable take-off fitting which may be readily attached to a channel-shaped electric conduit without interrupting the conduit.

When electrical wiring has been installed in a conduit system, it is often desirable to install branch conduits to supply additional electrical outlets for appliances or lighting equipment. Heretofore, whenever this condition arose it has been customary to disrupt the system by removing a strip of the main conduit from the surface to which it had been attached by removing the wiring from the conduit, and by cutting out of the conduit and its cover a section of suitable length to permit insertion of a junction box. The main conduit must then again be secured in its original position and the desired branch conduit attached to the junction box. A serious objection to this supplementary wiring has been that an entire strip of the main conduit from which the branch is to lead must be removed, the conduit appropriately cut and fitted to a junction box and the entire strip of conduit relaid.

The fitting of my invention eliminates substantially all of the difficulties heretofore encountered when installing branch conduits in conduit systems embodying conduits of generally channel-shaped cross-section and of the type installed with the open face of the channel away from the surface to which the conduit is attached. With the take-off fitting of my invention branch conduits may be installed merely by removing the cover of the main conduit and cutting out a small section of the cover. The take-off fitting of my invention itself provides a cover for the main conduit at the junction of the branch conduit with the main conduit. The new wires are tapped off from the main wires within the main conduit and led out over the upper edge of the said wall of the main conduit through my improved take-off fitting.

It is an important feature of the take-off fitting of my invention that it is adapted to provide an appropriate connection between the main conduit and the branch connection where the branch conduit is to be mounted on a surface which does not lie in the same plane as the surface upon which the main conduit is mounted. This feature is of especial value and utility in such circumstances as those existing where the main conduit is mounted on a wall immediately above a base board and where the branch conduit is to be mounted on the base board in a plane a short distance out from the wall. Moreover, the take-off fitting of my invention is adjustable so that it may be employed in any one of a number of installations where the distances between the plane on which the main conduit is mounted and the plane on which the branch conduit is mounted varies.

In using the fitting of this invention when installing a branch conduit it is necessary merely to remove the cover of the main conduit, cut out a small section of the cover, make the desired wiring, replace the cover of the main conduit, secure the base member of the take-off fitting to its surface in which the branch conduit is to be mounted, and snap the cover member of the take-off fitting over the base member of take-off fitting and open section of the conduit.

The adjustable take-off fitting of my invention comprises three elements: A cover member, a base member, and a U-shaped adjustment member. The cover member is of substantially channel-shaped cross section and is closed at one end. The sides of the cover member adjacent the closed end are adapted to engage the sides of an open main conduit with the major axis of the cover member substantially perpendicular to the major axis of the conduit. The base member is adapted substantially to close the open face of the channel-shaped cover member not in engagement with the conduit. The U-shaped adjustment element is disposed in slidable engagement with the closed end portion of the cover member, preferably within the closed end portion of the cover member, and is adapted to engage the top of the sides of the open conduit. The plane of the central portion of the U-shaped adjustment member slides in a plane substantially parallel to and adjacent the end wall of the cover member while the legs of the U-shaped member slide in planes substantially parallel to and adjacent the side walls of the cover member.

The invention will be better understood in the light of the following detailed description taken in conjunction with the drawing, in which:

Fig. 1 is a perspective view of the cover member of the take-off fitting;

Fig. 2 is a perspective view of the U-shaped adjustment member of the fitting;

Fig. 3 is a perspective view of the base member of the fitting;

Fig. 4 is a sectional assembly view of the complete fitting showing its relation to a main conduit and a base board on which a branch conduit is to be mounted; and Fig. 5 is a sectional view of the complete fitting attached to a main conduit and taken along line 5—5 of Fig. 4.

The cover member shown in Fig. 1 comprises a sheet metal stamping 1 of generally channel-shaped cross-section. One end of the stamping 2 is bent downwardly over the end of the cover member to form an end wall substantially closing that end. The sides 3 of the cover member adjacent the closed end thereof are appropriately cut away so that they form shoulders 4 that engage the side walls 6 of an open main conduit with the major axis of the cover member substantially perpendicular to the major axis of the main conduit. The sides of the cover member adjacent the closed end of the cover member are each provided with a projection 7 adapted to fit into an open conduit between the side walls thereof. The portions 8 of the side walls of the cover member nearest the closed end are adapted to rest upon the top 9 of one side wall of the main conduit while the portions 10 of the cover member side walls on the other side of the projections 7 are adapted to rest upon the top 11 of the other side wall of the main conduit. Each projection is provided with a raised portion 13 on the inside of the cover member which may comprise a groove stamped in the outside of the projection. The raised portion of the projection extends vertically from the lower edge of the projection substantially to the top of the sides of the cover member. A substantial portion of the lower edge of the cover member sides adjacent the cut-out portions thereof is provided with a groove 14 stamped in the outside of the cover member sides and is adapted to engage the base member of the adjustable take-off fitting.

The open end 15 of the cover member is appropriately tapered to engage the cover member of the branch conduit (not shown).

The U-shaped member shown in Fig. 2 comprises a strip of sheet metal bent on each side of the middle thereof to form two legs 16 substantially perpendicular to the central portion 17. The central portion of the U-shaped member is provided adjacent its lower edge with an extension 18 which is bent to engage the shoulder 19 of the side wall of the main conduit. The length of the central portion of the U-shaped member preferably is such that the member may slide freely between the side walls of the cover member adjacent the closed end with the plane of the central portion 17 of the U-shaped member parallel and adjacent to the plane of the end wall 2 of the cover member. The legs of the U-shaped member are provided with grooves 20 adapted to slidably engage the raised portions 13 of the cover member projections. Each leg is shaped adjacent the extremities 21 of its lower edge to rest upon the top of the side walls of an open conduit while the length of the legs is such that they extend to the shoulders 4 of the side walls of the cover member.

The base member of the fitting shown in Fig. 3 comprises a sheet metal stamping 22 adapted to substantially close the open face of the cover member not in engagement with the main conduit to which the cover member is attached. The base member is provided with a screw hole 23 for securing it to a base board 24, or the like, and with side walls 25 adapted to engage the grooved lower edge 14 of the sides of the cover member. One end of the base member is further provided with a tongued portion 26 whereby the base member may be attached to the base member of a take-off conduit.

When using the fitting of my invention for the installation of a take-off conduit, the fitting is attached in the following manner. The cover 27 of the main channel-shaped conduit is removed and a section cut out of the cover substantially equal to the width of the cover member of the fitting. The base member of the fitting is then secured to the baseboard or raised surface to which the take-off conduit is to be attached with the tongued end away from the main conduit and the other end of the base member adjacent the side of the main conduit. After the necessary wiring has been made and the take-off conduit has been attached to the tongued end of the base member, the U-shaped member is inserted within the closed end of the cover member as hereinbefore described with the upper edge of the central portion of the U-shaped member slightly above and within the lower edge of the closed end. The bent extension portion of the U-shaped member is then placed over the shoulder of the conduit side-wall opposite the base member of the fitting and the entire cover member unit permitted to rest on the top of the conduit side-walls directly above the base member of the fitting. The top of the cover member then is merely pressed downward until it has snapped onto the base member and has engaged the cover member of the take-off conduit.

The adjustable take-off fitting of my invention is inexpensive to manufacture and easily installed with any conduit of the type hereinbefore described. Its adjustability permits its immediate use with baseboards of any conventional size without altering the structure of the fitting while its construction is such as to permit ground connection between a main conduit and a take-off conduit.

Throughout the specification the expression "down" or "downwardly" has been used to mean in a direction toward the surface to which either the main conduit or the take-off conduit is attached.

I claim:

1. In a take-off fitting for electric conduit systems, the improvement which comprises a cover member of generally channel-shaped cross section partially closed by an end wall at one end and having the side walls of the cover member adjacent the closed end adapted to engage the sides of and to extend over the top of a main conduit with the major axis of the cover member substantially perpendicular to the major axis of the main conduit, and an adjustment element in slidable engagement with the closed end and side walls of the cover member, said adjustment element being adapted to engage the top of the sides of the main conduit.

2. In a take-off fitting for electric conduit systems, the improvement which comprises a cover member of generally channel-shaped cross section, shaped at one end to coaxially engage a branch conduit and partially closed by an end wall at the other end, the portion of the side walls adjacent the closed end of the cover member being adapted to engage the sides of an open electric conduit with the major axis of the cover member substantially perpendicular to the major axis of the main conduit, and an adjustment element in slidable engagement with the closed end and side walls of the cover member, said adjustment member being adapted to engage the top of the sides of the main conduit.

3. In a take-off fitting for electric conduit systems, the improvement which comprises a cover member of generally channel-shaped cross section partially closed by an end wall at one end and having the side walls of the cover member adjacent the closed end adapted to engage the sides of and to extend over the top of a main conduit with the major axis of the cover member substantially perpendicular to the major axis of the main conduit, an adjustment element in slidable engagement with the closed end and side walls of the cover member, said adjustment element being adapted to engage the top of the sides of the main conduit, and a base member adapted substantially to close the open face of the channel-shaped cover member.

4. In a take-off fitting for electric conduit systems of the type embodying a main conduit of generally channel-shaped cross section, the improvement which comprises a cover member of generally channel-shaped cross section shaped at one end to coaxially engage a branch conduit and partially closed by an end wall at the other end, the portion of the side walls adjacent the closed end of said cover member being shaped to engage the sides of and to extend over the top of a main conduit with the major axis of the cover member perpendicular to the major axis of the main conduit, and a U-shaped adjustment member in slidable engagement with the closed end and side walls of the cover member, said adjustment element being shaped to engage the sides of and to extend over the top of the main conduit.

FRANCIS PAUL D'ESOPO.